US010432045B2

(12) United States Patent
Hessenberger et al.

(10) Patent No.: US 10,432,045 B2
(45) Date of Patent: Oct. 1, 2019

(54) ELECTRIC MOTOR FOR A POWER TOOL

(71) Applicant: Milwaukee Electric Tool Corporation, Brookfield, WI (US)

(72) Inventors: Jeffrey C. Hessenberger, Neosho, WI (US); Michael Kolden, Wauwatosa, WI (US); Andrew T. Beyerl, Pewaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 696 days.

(21) Appl. No.: 14/072,007

(22) Filed: Nov. 5, 2013

(65) Prior Publication Data
US 2014/0125158 A1 May 8, 2014

Related U.S. Application Data

(60) Provisional application No. 61/723,142, filed on Nov. 6, 2012.

(51) Int. Cl.
*H02K 1/27* (2006.01)
*H02K 9/06* (2006.01)
(Continued)

(52) U.S. Cl.
CPC .............. *H02K 1/276* (2013.01); *H02K 5/15* (2013.01); *H02K 9/06* (2013.01); *H02K 7/145* (2013.01); *H02K 21/16* (2013.01)

(58) Field of Classification Search
CPC .. H02K 1/00; H02K 1/22; H02K 1/27; H02K 1/28; H02K 5/15; H02K 7/145; H02K 9/06; H02K 21/16
(Continued)

(56) References Cited

U.S. PATENT DOCUMENTS 5,475,204 A * 12/1995 Giamati ................. B64D 15/14
219/548
6,680,553 B1 * 1/2004 Takano .................... H02K 3/50
310/156.05
(Continued)

FOREIGN PATENT DOCUMENTS

CN 101032067 9/2007
CN 101300728 11/2008
(Continued)

OTHER PUBLICATIONS

Machine translation of DE 10 2007 060 011 A1.*
(Continued)

*Primary Examiner* — Michael Andrews
*Assistant Examiner* — Minki Chang
(74) *Attorney, Agent, or Firm* — Michael Best & Friedrich LLP

(57) ABSTRACT

An electric motor for use with a power tool includes a rotor having a body, a stator having a plurality of electromagnetic coils surrounding the rotor, an output shaft coupled to the rotor for rotation with the rotor, and a plurality of magnets positioned within the body of the rotor. The motor also includes a mechanical magnet holder coupled to at least one of the rotor and the output shaft to engage each of the plurality of magnets. The mechanical magnet holder inhibits movement of the plurality of magnets out of the body of the rotor.

21 Claims, 6 Drawing Sheets

(51) Int. Cl.
  *H02K 5/15* (2006.01)
  *H02K 21/16* (2006.01)
  *H02K 7/14* (2006.01)

(58) Field of Classification Search
  USPC ......... 310/156.25, 156.22, 156.01, 400, 402; 29/598
  See application file for complete search history.

(56) References Cited

U.S. PATENT DOCUMENTS

| | | | |
|---|---|---|---|
| 7,355,316 B2 | 4/2008 | Yokota et al. | |
| 7,737,583 B2* | 6/2010 | Bi | F16F 15/124 310/125 |
| 7,847,458 B2* | 12/2010 | Kim | H02K 1/276 310/156.16 |
| 7,895,729 B2* | 3/2011 | Longo | H02K 1/223 29/598 |
| 2006/0181168 A1 | 8/2006 | Hargraves et al. | |
| 2008/0174200 A1* | 7/2008 | Okamoto | H02K 15/02 310/216.018 |
| 2008/0265695 A1* | 10/2008 | Yoshida | H02K 5/20 310/50 |
| 2009/0021096 A1* | 1/2009 | Tatematsu | H02K 1/278 310/156.38 |
| 2009/0045689 A1* | 2/2009 | Haruno | H02K 1/276 310/156.56 |
| 2011/0140558 A1* | 6/2011 | Kinpara | H02K 5/15 310/89 |
| 2011/0227430 A1* | 9/2011 | Omori | B25F 5/00 310/50 |
| 2012/0146336 A1* | 6/2012 | Hori | H02K 1/2766 290/55 |
| 2013/0207491 A1 | 8/2013 | Hatfield et al. | |
| 2014/0042834 A1* | 2/2014 | Asahi | H02K 1/04 310/43 |

FOREIGN PATENT DOCUMENTS

| | | | |
|---|---|---|---|
| CN | 102545434 | 7/2012 | |
| CN | 202475068 | 10/2012 | |
| DE | 102007060011 A1 * | 7/2009 | ............. H02K 1/276 |
| GB | 2460529 | 12/2009 | |
| JP | 2000245086 | 9/2000 | |
| JP | 2005094888 | 4/2005 | |
| JP | 2005130688 | 5/2005 | |
| JP | 2012050226 | 3/2012 | |

OTHER PUBLICATIONS

Co-pending U.S. Appl. No. 14/972,023, filed Nov. 5, 2013.
English Translation of the First Office Action for Chinese Application No. 201310664455.9 dated Nov. 24, 2015 (13 pages).

* cited by examiner

ELECTRIC MOTOR FOR A POWER TOOL

CROSS-REFERENCE TO RELATED APPLICATIONS

This application claims priority to U.S. Provisional Patent Application No. 61/723,142, filed Nov. 6, 2012, the entire contents of which are incorporated by reference herein.

FIELD OF THE INVENTION

The present invention relates to power tools and, more particularly, to electric motors for use with power tools.

BACKGROUND OF THE INVENTION

Many power tools use electric motors, such as brushless DC motors, to drive the tools. A brushless DC motor typically includes a rotor and a stator. Permanent magnets are positioned in the rotor. In some situations, these magnets are held in the rotor with epoxy. Epoxy, however, is inefficient, expensive, and inconsistent. For example, epoxy can be messy and difficult to incorporate into an automated manufacturing process. In addition, lots of epoxy may be wasted during manufacture. Furthermore, assembling the magnets in the rotor with epoxy relies on the skill of an operator and may result in motor failure if done improperly.

SUMMARY OF THE INVENTION

In one embodiment, the invention provides an electric motor for use with a power tool. The motor includes a rotor having a body, a stator having a plurality of electromagnetic coils surrounding the rotor, an output shaft coupled to the rotor for rotation with the rotor, and a plurality of magnets positioned within the body of the rotor. The motor also includes a mechanical magnet holder coupled to at least one of the rotor and the output shaft to engage each of the plurality of magnets. The mechanical magnet holder inhibits movement of the plurality of magnets out of the body of the rotor.

In another embodiment, the invention provides a power tool including a housing, a drive mechanism positioned within the housing, and an electric motor positioned within the housing and operable to drive the drive mechanism. The motor includes a rotor having a body, a stator having a plurality of electromagnetic coils surrounding the rotor, and an output shaft coupled to the rotor for rotation with the rotor. The output shaft is coupled to the drive mechanism to drive the drive mechanism. The motor also includes a plurality of magnets positioned within the body of the rotor and a mechanical magnet holder coupled to at least one of the rotor and the output shaft to engage each of the plurality of magnets. The mechanical magnet holder inhibits movement of the plurality of magnets out of the body of the rotor.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
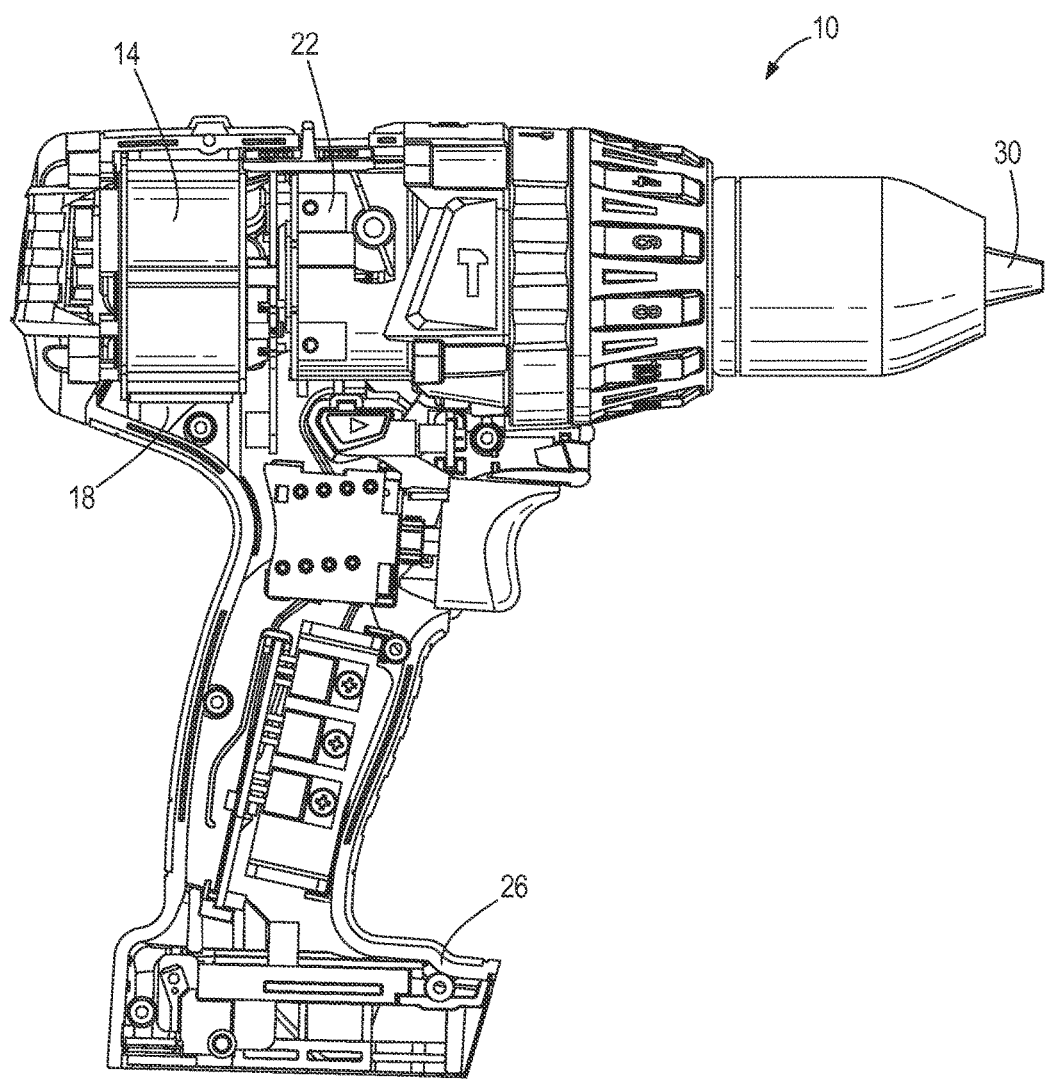
FIG. 1 is a side view of a power tool with a portion of a housing removed to show a motor.

FIG. 1 illustrates a power tool 10 including an electric motor 14, such as a brushless DC motor. In the illustrated embodiment, the power tool 10 is a hammer drill. In other embodiments, the power tool 10 may be, for example, a reciprocating saw, a circular saw, a jigsaw, a drill, an impact driver, a screwdriver, a pipe cutter, a grinder, a sander, a caulk gun, a grease gun, or the like. In further embodiments, the power tool 10 may be another type of device that uses an electric motor, such as a vacuum, a paint sprayer, lawn and garden equipment, or the like.

The motor 14 is positioned in a housing 18 of the power tool 10 and connected to a drive mechanism 22. The illustrated power tool 10 also includes a battery connection portion 26 formed on the housing 18. The battery connection portion 26 receives a battery pack to electrically couple the battery pack to the motor 14 through a switch and other electronics. The battery pack may be, for example, a 9V, 12V, 18V, 28V, or 36V Li-ion or NiMH battery pack. When powered, the electric motor 14 drives the drive mechanism 22 to operate a working element (e.g., a drill bit) connected to a chuck 30 of the power tool 10.

Figure 2:
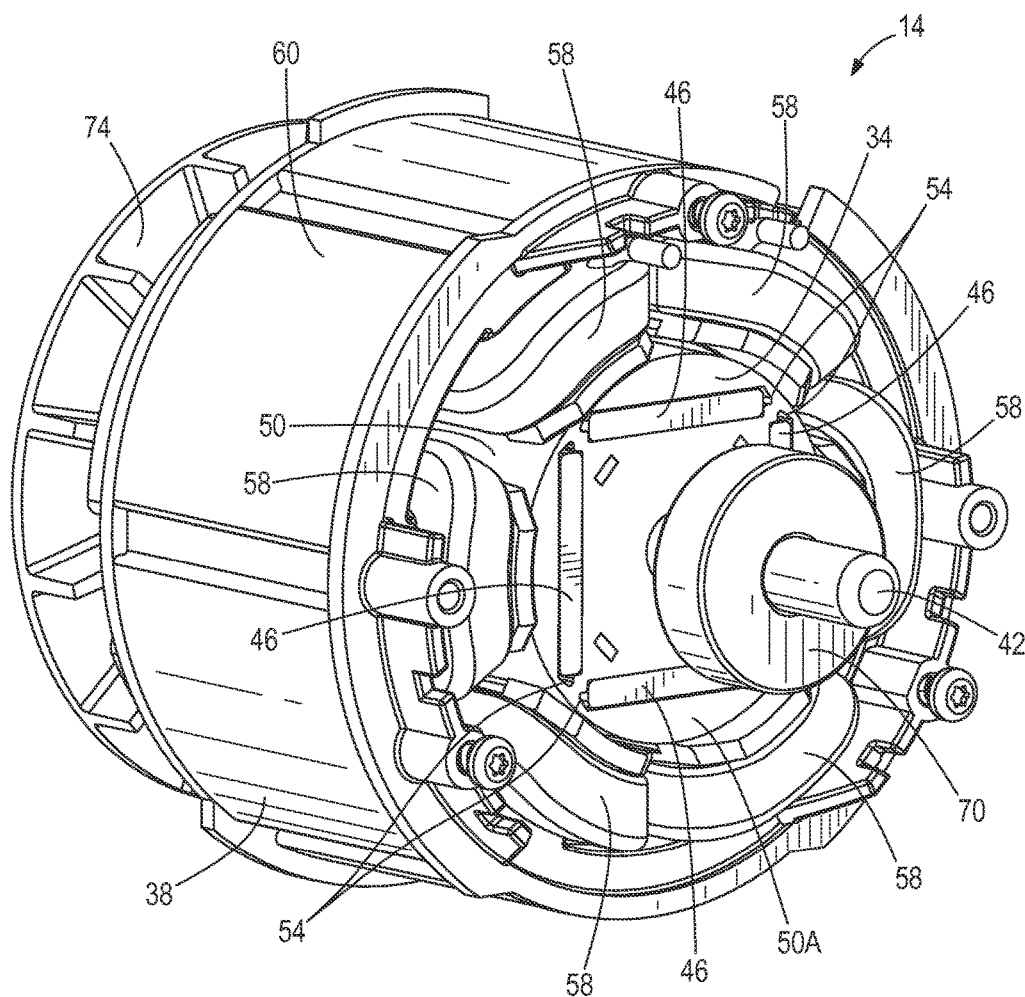
FIG. 2 is a perspective view of the motor shown in FIG. 1.

FIG. 2 illustrates the electric motor 14 in more detail. The motor 14 includes a rotor 34, a stator 38, and a motor shaft 42. The rotor 34 includes four permanent magnets 46 positioned in a body 50, or stack, of the rotor 34. The body 50 may be a laminated steel structure or powdered steel. The illustrated magnets 46 are received in corresponding slots 54 formed in the body 50 and extend between a first face 50A and a second face 50B (FIG. 4) of the body 50. The slots 54 are arranged generally perpendicular to one another in a square pattern in the body 50. The illustrated stator 38 includes six electromagnetic coils 58 surrounding the rotor 34. The coils 58 are surrounded by laminations 60 of the stator 38. When powered, the electromagnetic coils 58 create magnetic fields that interact with the permanent magnets 46 in the rotor 34 to rotate the rotor 34 relative to the stator 38. In other embodiments, the motor 14 may include fewer or more permanent magnets 46 in the rotor 34 and/or electromagnetic coils 58 in the stator 38.

The motor shaft 42, or output shaft, extends out of the rotor 34 to rotate with the rotor 34. The shaft 42 is fixed to the rotor 34 such that movement of the rotor 34 is transmitted to the shaft 42. In some embodiments, the shaft 42 may be fixed to the rotor 34 using suitable securing means, such as splines, knurls, press-fitting, adhesives, or the like. In other embodiments, a portion of the shaft 42 may be non-cylindrical to rotationally fix the shaft 42 to the rotor 34. In the illustrated embodiment, a portion of the shaft 42 is received within an opening 66 (FIGS. 7 and 8) in the rotor body 50. The opening 66 includes two radial cutouts 62. The cutouts 62 help relieve stress for a press-fit connection between the shaft 42 and the rotor body 50. In some embodiments, the cutouts 62 also help align secondary structures with the rotor body 50, as discussed below with reference to FIG. 5.

A bearing 70 is positioned on a first end of the shaft 42 to support the shaft 42, and thereby the motor 14, within the housing 18 of the power tool 10. A fan or impeller 74 is coupled to a second end of the shaft 42 to rotate with the shaft 42 and the rotor 34. The fan 74 creates an airflow around the motor 14 to cool the motor 14 during operation of the power tool 10. One or more bearings 78 (FIG. 4) are also coupled to the second end of the shaft 42 to support the fan 74 on the shaft 42 and to help support the motor 14 in the housing 18 of the power tool 10.

Figure 3:
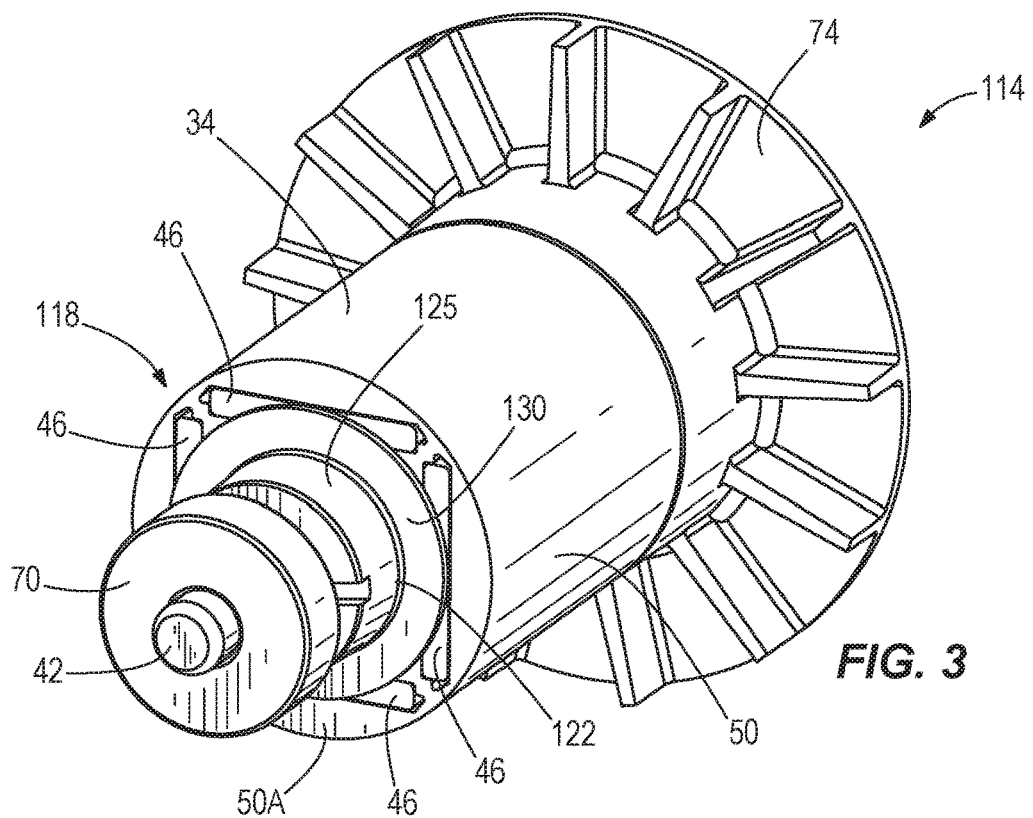
FIG. 3 is a perspective view of the motor including a bushing to hold magnets in the motor.

FIG. 3 illustrates a similar motor 114 including the rotor 34, the stator (not shown), the motor shaft 42, and the magnets 46. In this embodiment, the motor 114 also includes a mechanical magnet holder 118 comprising a bushing 122. The bushing 122 is coupled to the shaft 42 between the bearing 70 and the rotor 34. The bushing 122 is fixed (e.g., pressed, splined, etc.) to the shaft 42 for rotation with the shaft 42 and the rotor 34. In some embodiments, the bushing 122 may also be used to help balance the motor 114 when the rotor 34 is rotating at relatively high speeds.

The illustrated bushing 122 includes a generally cylindrical body 125 and a radially-extending flange 130 coupled to the body 125. The flange 130 may be a separate piece that is fixed (e.g., welded) to the body 125 or may be integrally formed (e.g., machined or molded) as a single piece with the body 125. In other embodiments, the flange 130 may not be permanently attached to the body 125. Instead, the flange 130 may be press-fit onto the shaft 42 between the bushing body 125 and the rotor body 50. In either embodiment, the flange 130 abuts the first face 50A of the rotor body 50 to hold the magnets 46 within the corresponding slots 54. In the illustrated embodiment, the flange 130 has a diameter that is generally equal to or greater than a perpendicular distance between opposing slots 54. As such, the flange 130 engages ends of the magnets 46 to inhibit the magnets 46 from sliding or otherwise moving axially out of the slots 54.

Figure 4:
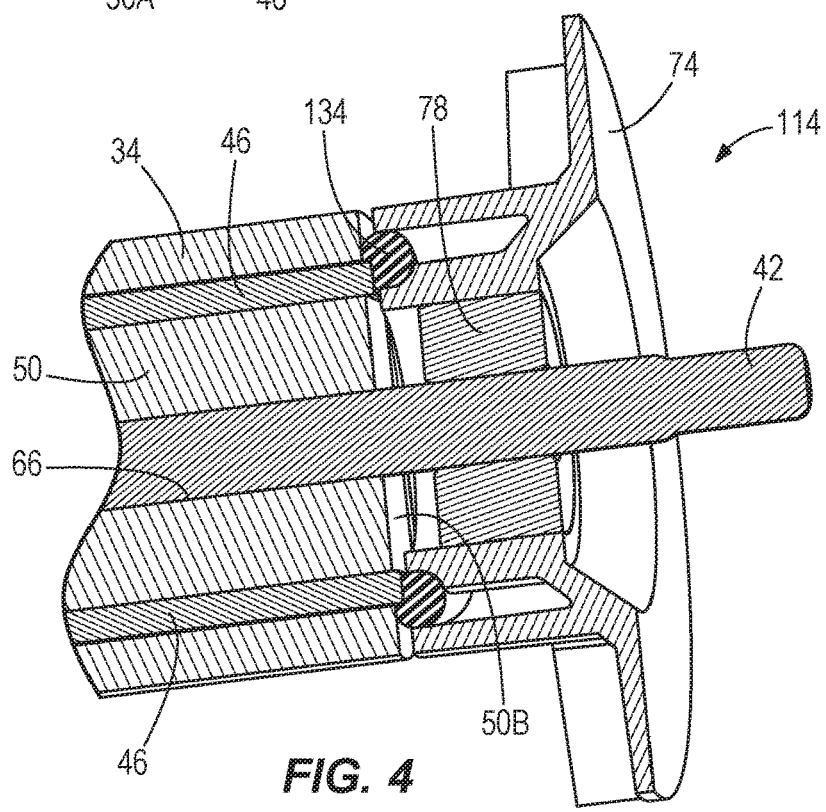
FIG. 4 is a cross-sectional view of the motor of FIG. 3.

As shown in FIG. 4, opposite ends of the magnets 46 also extend beyond the second face 50B of the rotor body 50. An elastomeric seal 134 (e.g., a rubber O-ring) is positioned between the second face 50B and the fan 74. The seal 134 takes up tolerances between the body 50 and the fan 74 to help hold the magnets 46 in the slots 54. Depending on how far the magnets 46 extend beyond the second face 50B of the body 50, the opposite ends of the magnets 46 can engage and compress the seal 134 to further inhibit axial movement of the magnets 46 within the rotor body 50. Although not shown, a similar elastomeric seal may be positioned between the rotor 34 and the fan 74 of each of the motors described below. In other embodiments, other types of biasing members, such as a conical spring or a wave spring, may be substituted for the elastomeric seal 134.

Figure 5:
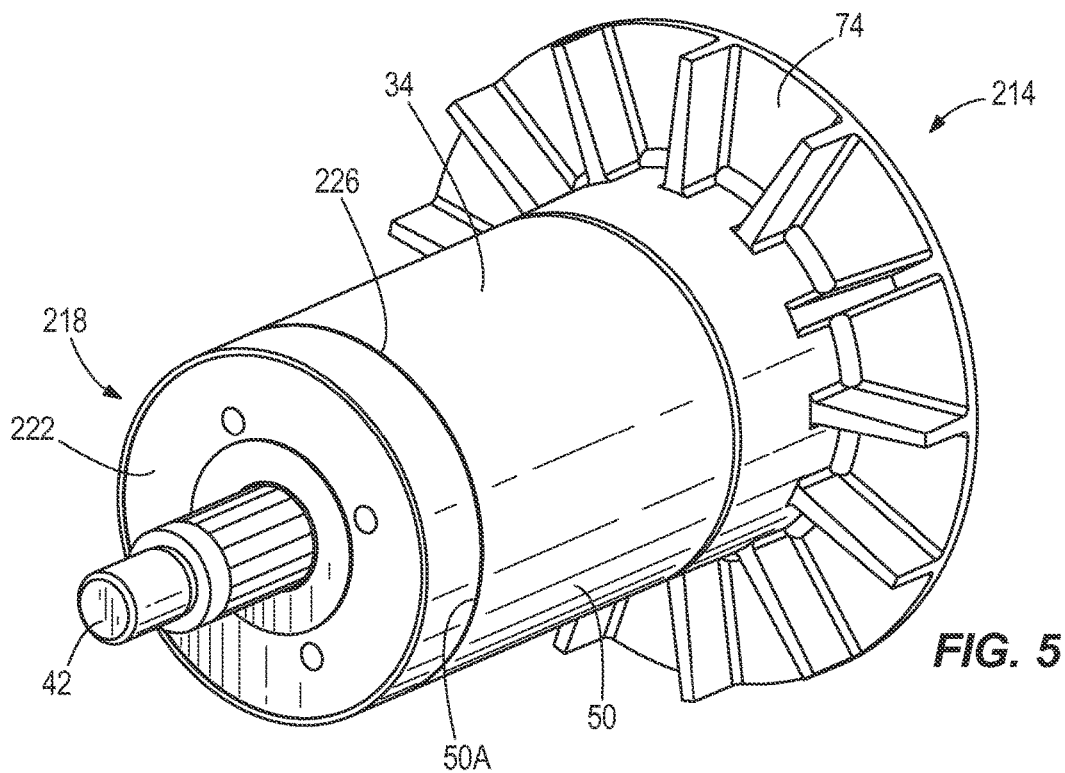
FIG. 5 is a perspective view of a motor including a sense magnet to hold magnets in the motor.

FIG. 5 illustrates another motor 214 including the rotor 34, the stator (not shown), the motor shaft 42, and the magnets (not shown; hidden behind a mechanical magnet holder 218). In this embodiment, the motor 214 also includes the mechanical magnet holder 218 comprising a sense magnet 222. The sense magnet 222 is coupled to the shaft 42 between the bearing (not shown) and the rotor 34. The magnet 222 is fixed (e.g., pressed, splined, etc.) to the shaft 42 for rotation with the shaft 42 and the rotor 34. In addition, the magnet 222 is radially aligned with the rotor 34 by corresponding projections that fit within the cutouts 62 (FIGS. 7 and 8) in the rotor body 50. In some embodiments, the sense magnet 222 may be, for example, the magnet of a Hall effect sensor to detect the rotational position of the rotor 34.

An inner face 226 of the magnet 222 abuts the first face 50A of the rotor body 50 to hold the magnets within the corresponding slots. In the illustrated embodiment, the magnet 222 has a diameter generally equal to an outer diameter of the rotor body 50 such that the magnet 222 covers the entire first face 50A. The magnet 222 engages ends of the magnets to inhibit the magnets from sliding or otherwise moving axially out of the slots. In other embodiments, the diameter of the sense magnet 222 may be larger or smaller than the outer diameter of the rotor body 50, as long as the sense magnet 222 engages at least some portions of the ends of the magnets.

Figure 6:
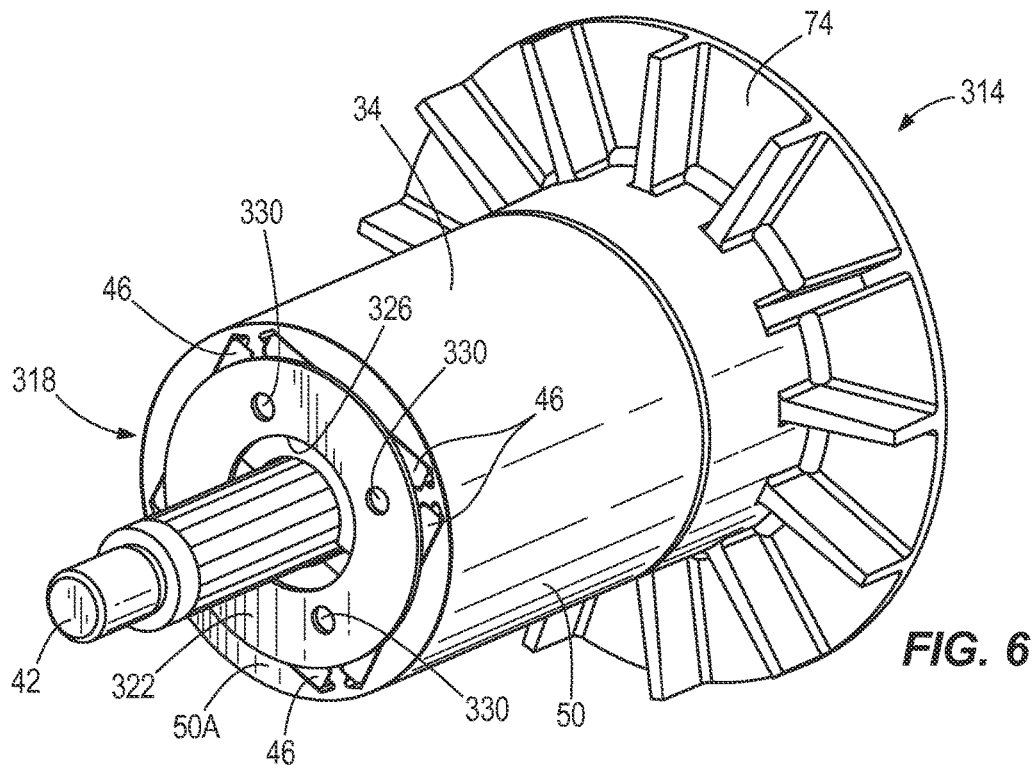
FIG. 6 is a perspective view of a motor including a plate to hold magnets in the motor.

FIG. 6 illustrates another motor 314 including the rotor 34, the stator (not shown), the motor shaft 42, and the magnets 46. In this embodiment, the motor 314 also includes a mechanical magnet holder 318 comprising a plate 322. The plate 322 is annular and relatively thin. In some embodiments, the plate 322 is composed of metal. The plate 322 defines a central opening 326 having a diameter that is generally larger than an outer diameter of the motor shaft 42. The plate 322 also has an outer diameter that is generally smaller than an outer diameter of the rotor body 50. In other embodiments, the plate 322 may be other shapes (e.g., square, hexagonal, etc.) and/or may be composed of other suitable materials.

The plate 322 is coupled directly to the first face 50A of the rotor body 50 to hold the magnets 46 within the corresponding slots. In the illustrated embodiment, the plate 322 is welded to the first face 50A at four weld spots 330. In other embodiments, the plate 322 may be welded to the first face 50A at fewer or more weld spots, or the plate 322 may be welded to the first face 50A along an inner or outer perimeter of the plate 322. In still other embodiments, other suitable coupling means may be employed to secure the plate 322 to the rotor body 50. When the plate 322 is secured to the first face 50A of the rotor body 50, the plate 322 engages ends of the magnets 46 to inhibit the magnets 46 from sliding or otherwise moving axially out of the slots 54. In other embodiments, the plate 322 may additionally or alternatively be press fit onto the shaft 42.

Figure 7:
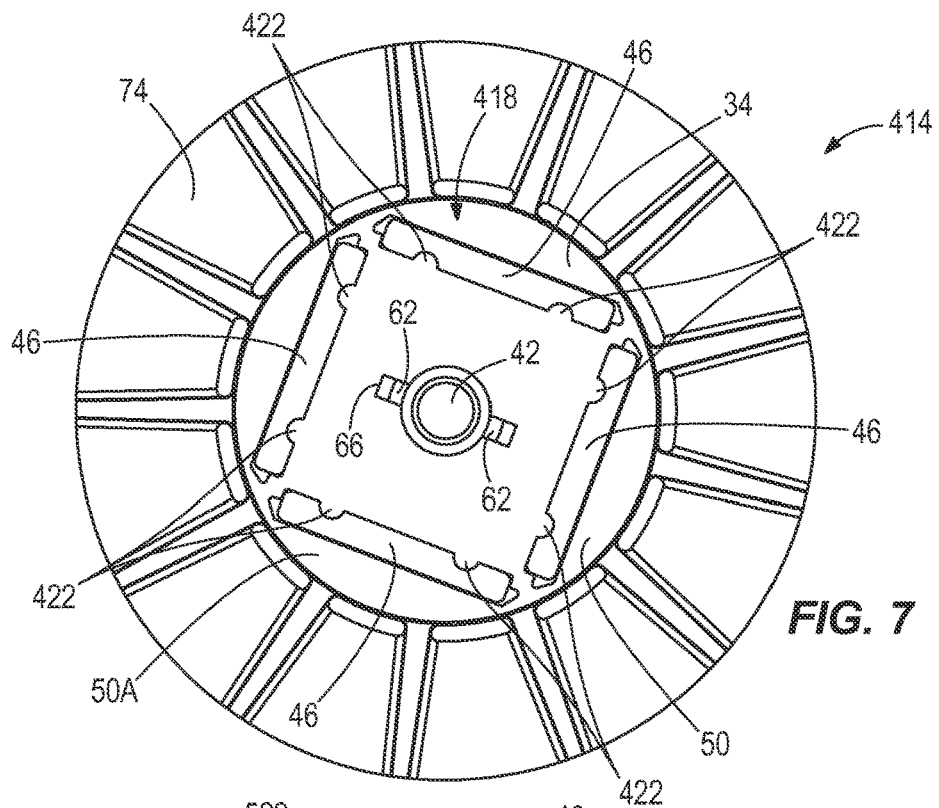
FIG. 7 is an end view of a motor including crush ribs to hold magnets in the motor.

FIG. 7 illustrates another motor 414 including the rotor 34, the stator (not shown), the motor shaft 42, and the magnets 46. In this embodiment, the motor 414 also includes a mechanical magnet holder 418 comprising crush ribs 422. In the illustrated embodiment, each crush rib 422 is a small bump of material (e.g., solder material, weld material, etc.) formed on the first face 50A of the rotor body 50. The crush ribs 422 engage ends of the magnets 46 to inhibit the magnets 46 from sliding or otherwise moving axially out of the slots 54.

The illustrated magnet holder 418 includes eight crush ribs 422, with a pair of crush ribs engaging each magnet 46. The crush ribs 422 in each pair are spaced apart from one another and engage a common edge of the corresponding magnet 46. With such an arrangement, the crush ribs 422 do not press on the entire edge of each magnet 46, thereby reducing the possibility of overly-compressing and breaking the magnets 46. In other embodiments, the crush ribs 422 may be positioned to engage opposing edges of each magnet

46. Additionally or alternatively, the magnet holder 418 may include fewer or more crush ribs 422 that engage each magnet 46.

Figure 8:
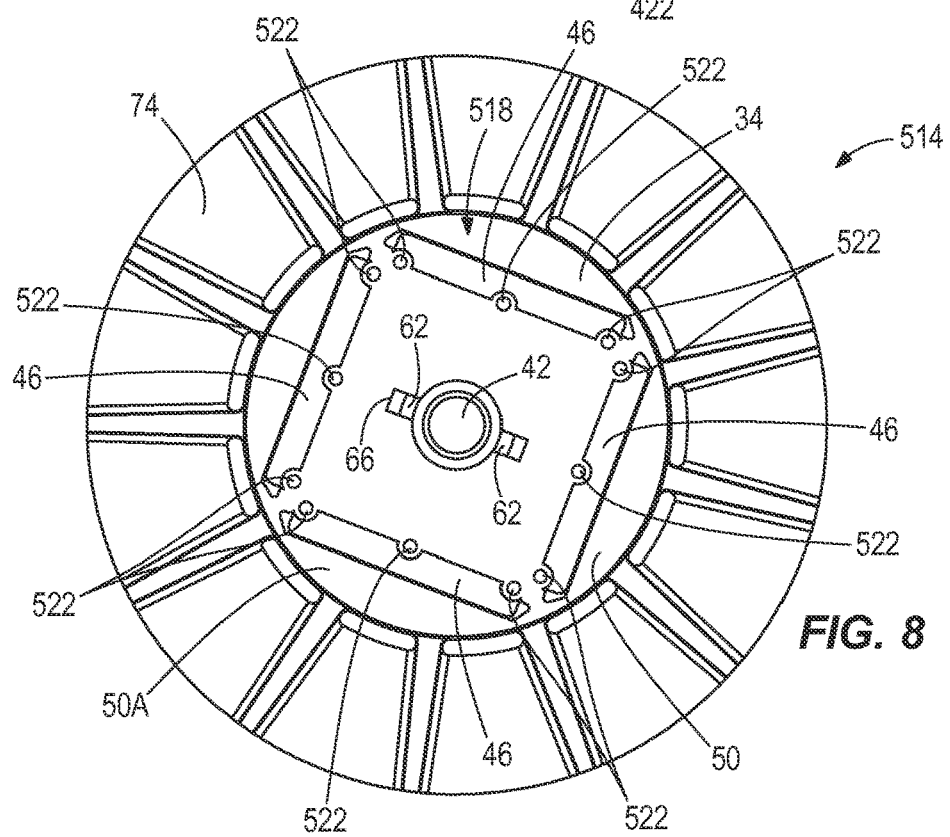
FIG. 8 is an end view of a motor including swage points to hold magnets in the motor.

FIG. 8 illustrates another motor 514 including the rotor 34, the stator (not shown), the motor shaft 42, and the magnets 46. In this embodiment, the motor 514 also includes a mechanical magnet holder 518 comprising swage points 522. The swage points 522 are formed using a swage process to displace material from the first face 50A of the rotor body 50 over each of the magnets 46. The swage points 522 engage ends of the magnets 46 to inhibit the magnets 46 from sliding or otherwise moving axially out of the slots 54.

In the illustrated embodiment, the magnet holder 518 includes twelve swage points 522, with a set of three swage points engaging each magnet 46. In each set, two swage points 522 engage opposing corners of the magnet 46 and one swage point 522 engages a mid portion of the magnet 522. The three swage points 522 all engage a common edge of the corresponding magnet 46. In other embodiments, the swage points 522 may engage opposing edges of the magnet 46 (e.g., two swage points 522 may engage opposing corners along one edge, while one swage point 522 engages a mid portion along the other edge). Additionally or alternatively, the magnet holder 518 may include fewer or more swage points 522 that engage each magnet 46.

Figure 9:
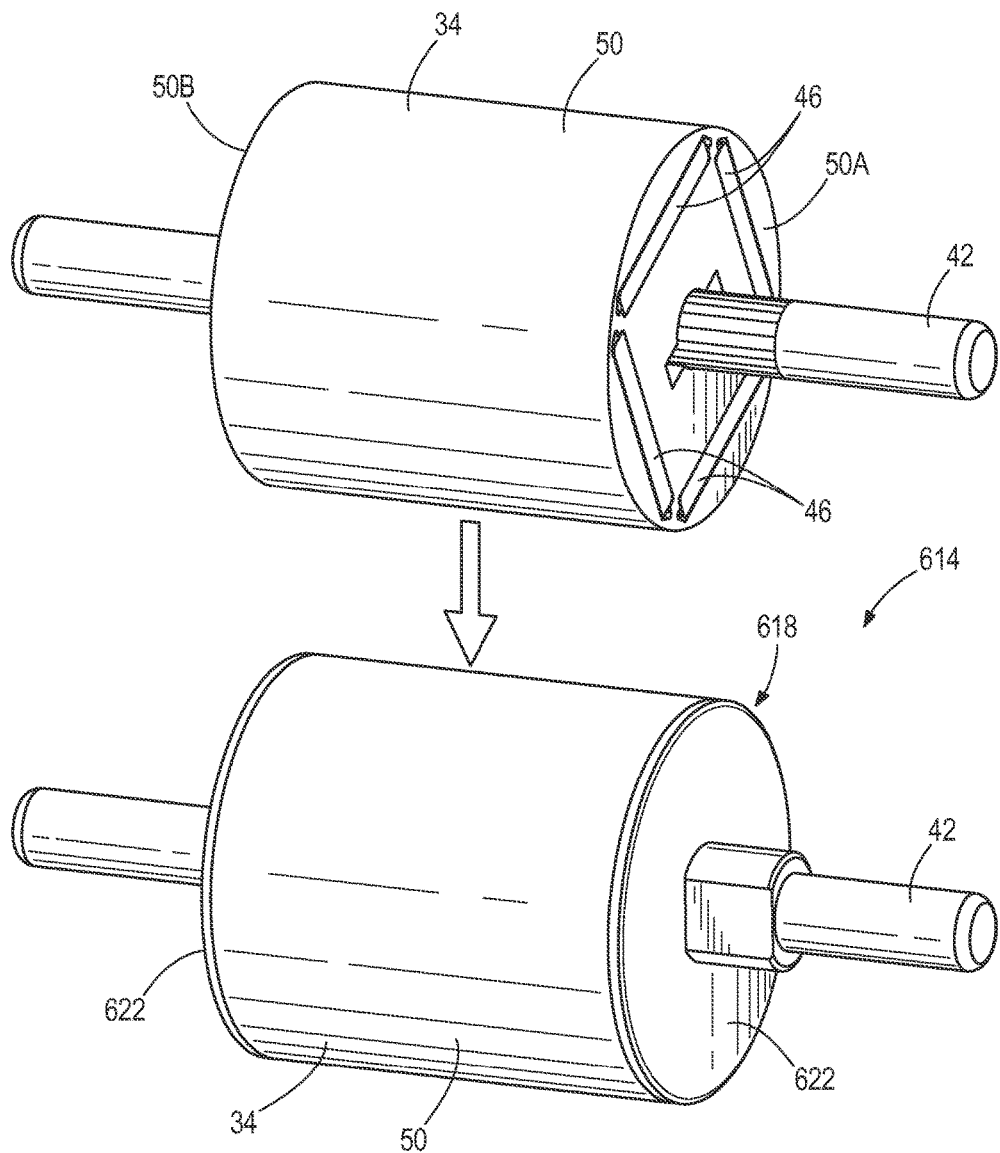
FIG. 9 is a perspective view of a motor before and after the motor is insert molded to hold magnets in the motor.

FIG. 9 illustrates another motor 614 including the rotor 34, the stator (not shown), the motor shaft 42, and the magnets 46. In this embodiment, the motor 614 also includes a mechanical magnet holder 618 comprising an insert mold 622. The insert mold 622 is formed over a portion of the shaft 42 adjacent the first face 50A and the second face 50B of the rotor body 50. The insert mold 622 substantially covers both the first face 50A and the second face 50B of the body 50 to engage both ends of the magnets 46 and inhibit the magnets 46 from sliding or otherwise moving axially out of the slots 54. In other embodiments, the insert mold 622 may only cover one face of the body (e.g., the first face 50A). In such embodiments, the other ends of the magnets 46 may be held in the rotor body 50 by the fan 74 and the elastomeric seal 134 discussed above with reference to FIG. 4.

In the illustrated embodiment, the insert mold 622 may be formed of any suitable plastic material. For example, the rotor 34 and the shaft 42 may be positioned in a die, and molten plastic material may be injected into the die. As the plastic material cools, the material forms the desired insert mold 622. In other embodiments, the insert mold 622 may be an epoxy or adhesive coat formed over the shaft 42 and the faces 50A, 50B of the rotor body 50. Additionally or alternatively, the insert mold 622 may be formed in other suitable shapes or configurations on the rotor 34 and the shaft 42.

The mechanical magnet holders 118, 218, 318, 418, 518, 618 discussed above fix the permanent magnets 46 in the body 50 of the rotor 34 without glue or epoxy. As such, the holders 118, 218, 318, 418, 518, 618 are efficient, cost effective, and consistent. Assembling the holders 118, 218, 318, 418, 518, 618 on a motor can be easily automated without requiring an operator. In addition, using the elastomeric seal 134 on an opposite end of the magnets 46 applies pressure to the magnets 46 over a wide range of tolerances, ensuring the magnets 46 are always fixed within the rotor body 50.

Although the invention has been described with reference to certain preferred embodiments, variations and modifications exist within the scope and spirit of one or more independent aspects of the invention as described.

Various features and advantages of the invention are set forth in the following claims.

What is claimed is:

1. An electric motor for use with a power tool, the motor comprising:
   a rotor including a body;
   a stator including a plurality of electromagnetic coils surrounding the rotor;
   an output shaft coupled to the rotor for rotation with the rotor;
   a fan coupled to the output shaft for rotation with the output shaft;
   a plurality of magnets positioned within the body of the rotor;
   a mechanical magnet holder located adjacent a first face of the body, the mechanical holder coupled to at least one of the rotor and the output shaft to engage each of the plurality of magnets, the mechanical magnet holder inhibiting movement of the plurality of magnets out of the body of the rotor; and
   a rubber ring positioned between a second face of the body and the fan;
   wherein ends of the plurality of magnets extend beyond the second face of the body, and wherein the rubber ring engages each of the plurality of magnets and the fan to be compressed between the plurality of magnets and the fan.

2. The motor of claim 1, wherein the mechanical magnet holder is a single, unitary component that engages each of the plurality of magnets.

3. The motor of claim 2, wherein the mechanical magnet holder includes a bushing having a radially extending flange, wherein the bushing is fixed to the output shaft for rotation with the output shaft, and wherein the radially-extending flange engages ends of the plurality of magnets to inhibit the plurality of magnets from moving axially out of the body.

4. The motor of claim 2, wherein the mechanical magnet holder includes a sense magnet, wherein the sense magnet is fixed to the output shaft for rotation with the output shaft, and wherein the sense magnet engages ends of the plurality of magnets to inhibit the plurality of magnets from moving axially out of the body.

5. The motor of claim 2, wherein the mechanical magnet holder includes a plate, wherein the plate is fixed directly to the first face of the body, and wherein the plate engages ends of the plurality of magnets to inhibit the plurality of magnets from moving axially out of the body.

6. The motor of claim 1, wherein the mechanical magnet holder includes a plurality of discrete, spaced apart components that engage the plurality of magnets.

7. The motor of claim 6, wherein the mechanical magnet holder includes a plurality of crush ribs formed on the body of the rotor, and wherein each crush rib engages an end of one of the plurality of magnets to inhibit the plurality of magnets from moving axially out of the body.

8. The motor of claim 6, wherein the mechanical magnet holder includes a plurality of swage points formed in the body of the rotor, and wherein each swage point engages an end of one of the plurality of magnets to inhibit the plurality of magnets from moving axially out of the body.

9. The motor of claim 1, wherein the mechanical magnet holder includes an insert mold formed over a portion of the output shaft and a portion of the body of the rotor, and wherein the insert mold engages ends of the plurality of magnets to inhibit the plurality of magnets from moving axially out of the body.

10. The motor of claim 1, wherein the rubber ring is a rubber O-ring.

11. The motor of claim 1, wherein the rubber ring applies a pressure to the plurality of magnets to bias the plurality of magnets into engagement with the mechanical magnet holder.

12. The motor of claim 1, wherein the fan includes a groove at least partially extending around the output shaft, and wherein a portion of the rubber ring is received within the groove.

13. A power tool comprising:
a housing;
a drive mechanism positioned within the housing; and
an electric motor positioned within the housing and operable to drive the drive mechanism, the motor including
a rotor including a body,
a stator including a plurality of electromagnetic coils surrounding the rotor,
an output shaft coupled to the rotor for rotation with the rotor, the output shaft is coupled to the drive mechanism to drive the drive mechanism,
a fan coupled to the output shaft for rotation with the output shaft,
a plurality of magnets positioned within the body of the rotor,
a mechanical magnet holder located adjacent a first face of the body, the mechanical holder coupled to at least one of the rotor and the output shaft to engage each of the plurality of magnets, the mechanical magnet holder inhibiting movement of the plurality of magnets out of the body of the rotor, and
a rubber ring positioned between a second face of the body and the fan,
wherein ends of the plurality of magnets extend beyond the second face of the body, and wherein the rubber ring engages each of the plurality of magnets and the fan to be compressed between the plurality of magnets and the fan.

14. The power tool of claim 13, wherein the mechanical magnet holder is a single, unitary component that engages each of the plurality of magnets.

15. The power tool of claim 14, wherein the mechanical magnet holder includes a bushing having a radially extending flange, wherein the bushing is fixed to the output shaft for rotation with the output shaft, and wherein the radially-extending flange engages ends of the plurality of magnets to inhibit the plurality of magnets from moving axially out of the body.

16. The power tool of claim 14, wherein the mechanical magnet holder includes a sense magnet, wherein the sense magnet is fixed to the output shaft for rotation with the output shaft, and wherein the sense magnet engages ends of the plurality of magnets to inhibit the plurality of magnets from moving axially out of the body.

17. The power tool of claim 14, wherein the mechanical magnet holder includes a plate, wherein the plate is fixed directly to the first face of the body, and wherein the plate engages ends of the plurality of magnets to inhibit the plurality of magnets from moving axially out of the body.

18. The power tool of claim 13, wherein the mechanical magnet holder includes a plurality of discrete, spaced apart components that engage the plurality of magnets.

19. The power tool of claim 18, wherein the mechanical magnet holder includes a plurality of crush ribs formed on the body of the rotor, and wherein each crush rib engages an end of one of the plurality of magnets to inhibit the plurality of magnets from moving axially out of the body.

20. The power tool of claim 18, wherein the mechanical magnet holder includes a plurality of swage points formed in the body of the rotor, and wherein each swage point engages an end of one of the plurality of magnets to inhibit the plurality of magnets from moving axially out of the body.

21. The power tool of claim 13, wherein the rubber ring is a rubber O-ring.

* * * * *